J. A. HEDBERG.
ANIMAL TRAP.
APPLICATION FILED MAY 31, 1919.
1,362,695.
Patented Dec. 21, 1920.
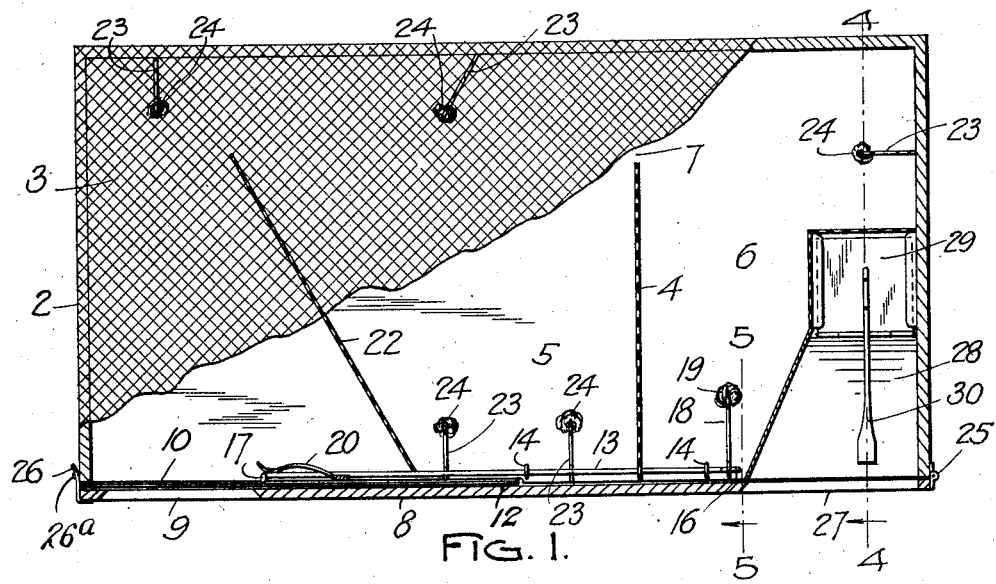
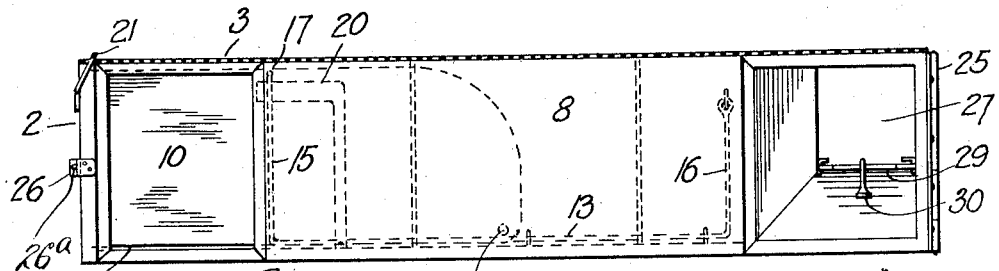
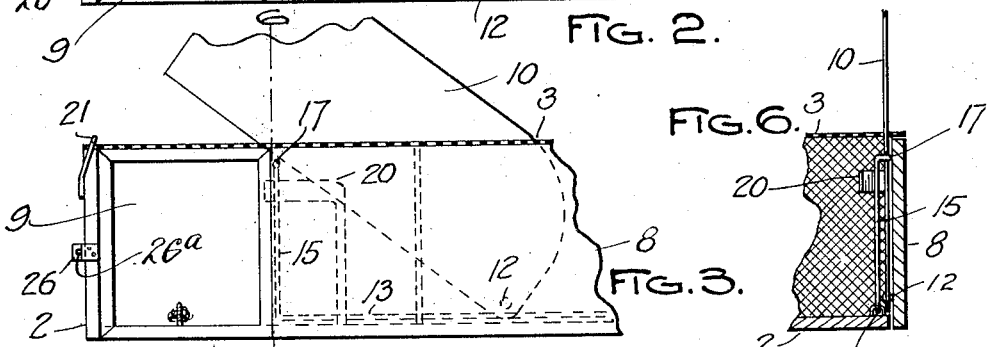
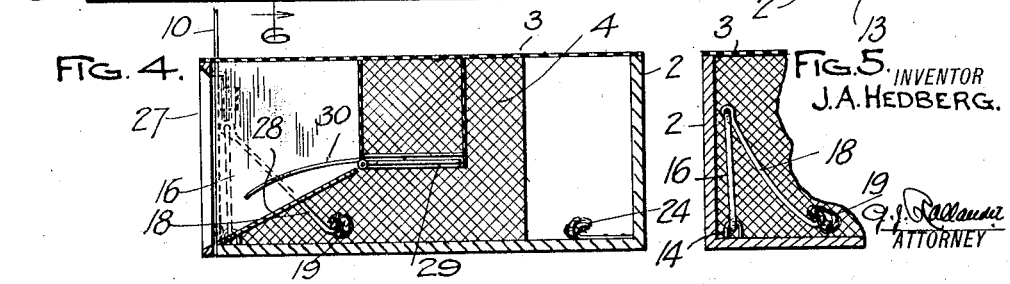
INVENTOR
J. A. HEDBERG.
ATTORNEY

UNITED STATES PATENT OFFICE.

JOHN A. HEDBERG, OF DENVER, COLORADO.

ANIMAL-TRAP.

1,362,695. Specification of Letters Patent. Patented Dec. 21, 1920.

Application filed May 31, 1919. Serial No. 300,873.

*To all whom it may concern:*

Be it known that I, JOHN A. HEDBERG, a citizen of the United States, residing at Denver, in the county of Denver and State of Colorado, have invented certain new and useful Improvements in Animal-Traps, of which the following is a specification.

This invention relates to animal traps and more particularly to traps designed for catching rats, mice and other small animals.

It is the primary object of my invention to provide a cage which is adapted to receive and retain a number of rodents, and in connection with said cage, a gate and a mechanism associated therewith which operate conjunctively to entrap several of the rodents in the cage at one time.

With this object in view my improved trap comprises a cage divided into two communicating compartments one of which has an entrance to admit the rodents. A self-closing door adapted to cover the entrance is held in an open position by a catch on a mechanism whose releasing member is located in the second compartment. A bait on the releasing member provides for its actuation by the action of an animal entering the second compartment, to release the door by retraction of the catch and thereby entrap the anmials which are in the cage at that time.

Having thus briefly explained the nature of my animal trap, I will now proceed to describe the same in detail with reference to the accompanying drawings in which like characters of reference designate corresponding parts throughout the several views, and in which—

Figure 1 is a partially sectional plan view of my improved trap;

Fig. 2, a front elevation of the same;

Fig. 3, a fragmentary front elevation of the trap showing its gate in the raised position;

Fig. 4, a section taken on the line 4—4, Fig. 1;

Fig. 5, a fragmentary section taken on the line 5—5, Fig. 1, and

Fig. 6, a fragmentary section on the line 6—6, Fig. 3.

The reference character 2 designates the cage which consists preferably of a rectangular box the top of which is covered with wire netting 3. A partition 4 preferably made of wire netting, divides the interior of the box into two compartments 5 and 6 which are connected by a narrow passage 7.

The first compartment has in the front 8 of the cage and adjacent its end remote from the other compartment, an admission opening 9 which can be closed by a drop gate 10 which moves through a slot in the top of the box and which is pivoted to the front wall of the same as at 12.

The mechanism that controls the movement of the gate consists of a rocker shaft 13 mounted in bearings 14 on the bottom of the box and having at its ends, upwardly extending arms 15 and 16 one of which is in juxtaposition to the admission opening and the other one of which is disposed within the second compartment.

The arm 15 is bent at its upper end to provide a catch 17 upon which the gate in its raised position, rests, as shown in Fig. 3, and the other arm has at its upper end an eye for its connection with a bait holder which preferably is composed of a downwardly extending hook 18 to which the bait 19 is attached as best shown in Fig. 5.

A spring 20 pressing against the arm 15 of the rocker shaft, yieldingly maintains the mechanism in its normal operative condition and a spring catch 21 extending across the slot through which the gate has its movement, locks it in its closed position.

The first compartment of the cage may if so desired be subdivided by a partition 22 to provide a circuitous course from the entrance 9 to the passage 7, for the purpose of retaining the rodents and hindering their return to the opening.

In the operation of my invention a quantity of bait such as cracked corn, is disposed on the floor of the first compartment of the cage and the animals may further be enticed to enter the trap by bait 24 impaled on prongs 23 projecting from the walls thereof.

The front wall 8 of the cage is hinged at one of its ends as at 25 and fastened by a spring latch 26 at its opposite end for the removal of the entrapped animals after they have been killed, the latch coöperating with a catch 26ᵃ on a relatively stationary part of the cage.

It may be desirable to provide a second entrance-opening normally covered by an automatically closing door, through which other rodents may enter the trap after the main entrance has been closed by the gate 10.

An opening of this character made in the front wall of the second compartment of the cage, has been shown at 27 in the drawings. The opening provides an entrance to a short inclosed passage which at the end of an inclined floor 28 has an opening normally closed by a trap door 29 which is overbalanced by a counterweight 30.

It will be seen that after the animals have been entrapped in the cage by closing of the gate, other animals may enter the same through the trap door without permitting the escape of those within the trap.

In the operation of my invention, the first compartment of the cage is supplied with bait in sufficient quantity to entice a number of rats or mice which enter one after another through the small opening whose door is held in the open position by the catch of the releasing mechanism.

When a number of the rodents have congregated in the first compartment of the cage and have eaten most of the bait with which it was supplied, one of them in search of other food, will pass into the second compartment in which the baited releasing member of the gate-controlling mechanism is disposed. The animal gnawing at this bait actuates the mechanism so as to retract the catch, thereby causing the gate to move to its closing position.

All the animals which at that time were in the cage are thus entrapped and they may subsequently be killed by immersing the cage in a body of water.

In order to obtain the best results in the operation of the invention it is desirable, although not essential, that the mesh of the wire net in partition 4 be made sufficiently small to prevent rodents congregated in the first compartment from perceiving the bait in the other compartment, and it will be understood that if so desired the partition may be made of solid and opaque material within the spirit of my invention.

Having thus described the construction of my improved trap, it will be understood that its proportions and the arrangement of its parts must necessarily be varied in accordance with the size and nature of the animals for which it is designed and that variations in the construction of its gate controlling mechanism and other operating parts may be resorted to within the spirit of the invention as defined in the following claims:

What I claim and desire to secure by Letters-Patent is:

1. An animal trap comprising a cage divided into communicating first and second compartments and having an admission opening in the first compartment, a subdividing partition extending partially across the first compartment, forming a circuitous course between its admission-opening and the second compartment, a self-closing gate adapted to cover the admission-opening, and a mechanism adapted to hold the gate in its open position and including a releasing member in the second compartment outside the other.

2. An animal trap comprising a cage divided into communicating first and second compartments and having an admission-opening in the first compartment, a self-closing gate adapted to cover the admission-opening, a rocker-shaft, an arm on the shaft, adapted to hold the gate in its open position, a second arm on the shaft, within the second compartment, means on said arm for holding a bait, and a spring to yieldingly maintain the shaft in its normal position.

3. An animal trap comprising a cage divided into communicating first and second compartments and having an admission-opening in the first compartment, a self-closing gate adapted to cover the admission-opening, a rocker-shaft, an arm on the shaft, adapted to hold the gate in its open position, a second arm on the shaft, within the second compartment, a bait-holder pivoted on said second arm, and a spring to yieldingly maintain the shaft in its normal position.

4. An animal trap comprising a chamber having an entrance, a gate adapted to close the same, a second chamber connected with the other by a restricted opening, and mechanism to effect a closing movement of the gate, including a releasing member disposed in the second chamber so that it can be actuated by an animal only after it has entered the same through said opening.

5. An animal trap comprising a chamber having an entrance, a gate adapted to close the same, a second chamber connected with the other by a restricted opening, and mechanism to effect a closing movement of the gate, including a bait-holding actuating member disposed in the second chamber so that a bait thereon can be perceived by an animal only after having entered the same through said opening.

6. An animal trap comprising a chamber having an entrance, a gate adapted to close the same, mechanism to effect a closing movement of the gate, including a bait holding actuating member, and means to conceal said member from animals entering the chamber through said entrance.

In testimony whereof I have affixed my signature.

JOHN A. HEDBERG.